Sept. 17, 1946.　　　L. C. HOTVEDT　　　2,407,832
COMBINATION HAND TOOL
Filed Aug. 10, 1943　　　2 Sheets-Sheet 1
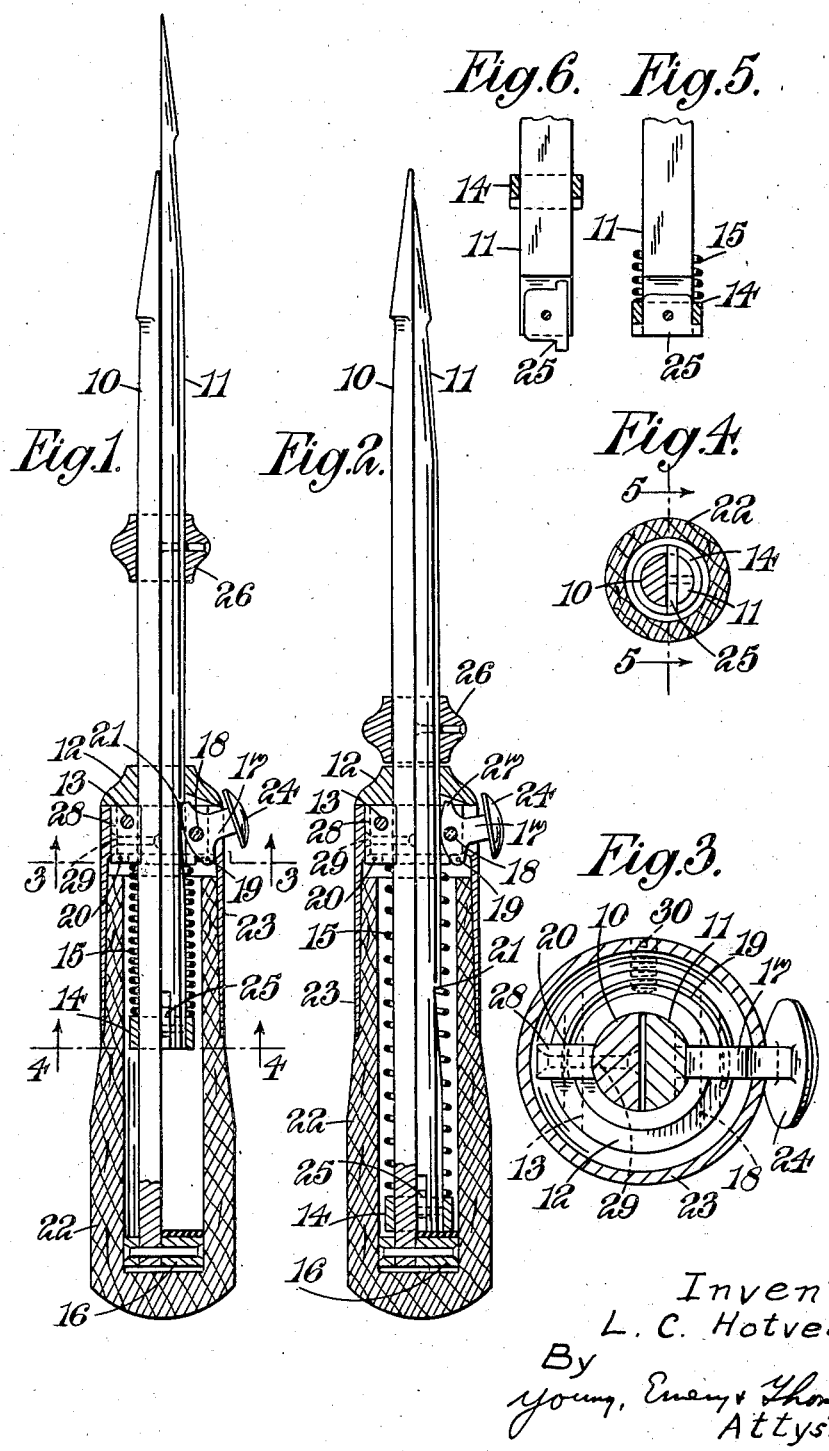

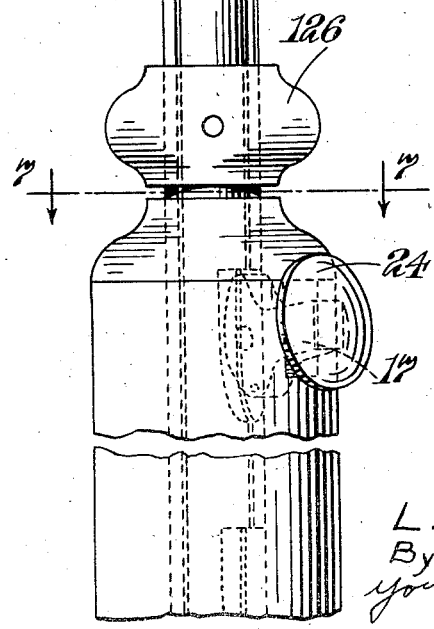

Patented Sept. 17, 1946

2,407,832

UNITED STATES PATENT OFFICE 2,407,832

COMBINATION HAND TOOL

Ludvig Christiansen Hotvedt, Cambridge, England

Application August 10, 1943, Serial No. 498,115
In Great Britain August 10, 1942

5 Claims. (Cl. 7—15)

This invention consists in improvements in or relating to combination hand tools and has for its object to provide a multi-purpose tool in a compact and effective form.

Broadly, the present invention consists in a tool comprising the combination of a handle, at least two tools retained within the handle and arranged to be relatively slidable side by side, means normally to retain one or more of said tools with its or their working end or ends positioned inwardly below the working end of another one of the tools, and means enabling the first-mentioned tool or tools to be slid outwardly beyond the other for the purpose of replacing one tool for another in position for use.

Where reference is made to one or more of the tools being retained inwardly below the working end of another tool, this is to be understood as meaning that it or they are held each with its working end nearer to the handle than is the working end of the other tool, which latter projects sufficiently to enable its working end to be utilised.

Conveniently, that tool or those tools which are normally retained inwardly is or are held in the inward position by means of a spring or springs also contained within the handle. When one of the normally inoperative tools is to be slid into its operative position it will be moved against the action of the spring (which spring normally draws it inwardly) and will be retained in its extended position by a catch having an actuating portion exposed on the outside of the handle so that when it is desired to return the tool the catch can be released and the control spring will withdraw the released tool inwardly once again.

In order that the invention may be more clearly understood, one preferred example will now be described with the aid of the accompanying drawings which show a combination tool containing two implements and in which Figure 1 is a central section showing one of the tools in combination;

Figure 2 is a similar section showing the other tool in operation;

Figure 3 on an enlarged scale is a section on the line 3—3 of Figure 1;

Figure 4 is a section on the line 4—4 of Figure 1;

Figure 5 is a section on the line 5—5 of Figure 4;

Figure 6 is a view similar to Figure 5 showing the catch by which the tool is permanently retained in position turned to enable the tool or implement to be assembled;

Figure 7 is a section similar to Figure 4 showing the modification of the invention in which three implements are employed and is a section on the line 7—7 of Figure 8, Figure 8 is a partial elevation of the tool having three implements.

Like references indicate like parts in the several figures of the drawings.

The two tools or implements 10 and 11 have flat sliding faces engaged with one another with their outer extremities formed to provide the requisite tool shape. For instance, implement 10 may have its extremity formed to serve as a screwdriver, whereas that of implement 11 may be formed as a sharp point to serve as an awl. When in the assembled position the joint contour of the two implements face to face is circular in cross-section and is mainly cylindrical although, towards the outer or working ends of the tools one or both of them may be slightly shaped. In the drawings they are shown as slightly tapered.

To the tool 10 there is attached a collar 12 by means of a rivet 13, and between this collar and a stop 14 on the inner end of the other tool, is a coiled compression or control spring 15. A cooperating stop 16 riveted to the inner extremity of tool 10 serves to limit the inward movement of tool 11 as clearly shown in Figure 2.

Mounted in collar 12 is a catch 17 pivoted in the collar on a pin 18 and controlled by a spring 19 coiled round the collar. One end of this spring is anchored at 20 to a block 28 and at its other end is engaged with the tail end of the catch in such manner as normally to force the nose 27 of the catch inwardly towards a notch formed in the slidable implement 11. The block 28 which is attached to the tool 10 by means of a rivet 29 serves to prevent the tool from turning about its longitudinal axis in the collar 12.

All the portions so far described up to the collar 12 are received within a recess in handle 22 and are retained therein by a ferrule 23 which is fastened to collar 12 by means of a grub screw 30, see Figure 3, the collar 12 being slotted for the passage of the shank of the catch 17, which shank terminates in a button 24 which serves for manual operation of the catch from the outside of the handle.

The stop 14 in the form of a collar is secured to tool 11 by means of a pivoted T-piece 25 which, when moved into the position shown in Figure 6, can pass through collar 14 to be subsequently turned into the position shown in Figure 5 where the lateral extensions of the T-piece engage within diametrically opposed slots formed at opposite ends of a diameter of the collar.

In order to facilitate withdrawal of implement 11 from the position of Figure 2 to that of Figure 1, another collar 26, surrounding snugly the two implements, is riveted to implement 11 and serves as a finger-grip whereby tool 11 can be withdrawn outwardly, compressing spring 15 in so doing. To bring tool 11 into operative position it will be drawn outwardly sufficiently far to permit catch 17 to engage behind the notch 21. When, however, it is desired to use tool 10 it is only necessary to pivot catch 17 by means of button 24 to release catch 17 and allow tool 11 to return inwardly under the action of spring 15.

The invention is not limited to the particular means shown for interconnecting the parts and the illustrated form is to be understood purely as an example of one convenient arrangement which serves to retain the two tools or implements 10 and 11 in close sliding engagement at all times by reason of the provision of collars 12, 26 and the upper end of ferrule 23.

The invention is not limited, moreover, to the use of two implements as obviously this number could be exceeded and, conveniently, the cross-sectional contour of the tools or implements, whatever number is employed, will preferably be a proportionate segment of the circular cross-section of the composite tool.

The nature of the tools or implements provided may afford any desired combination, that of a screwdriver and awl being merely an example.

When more than two sliding tools or implements are to be provided, means will be needed for retaining each of the sliding tools in its extended position and, when not required for use, to release it so that it may be withdrawn inwardly into the handle. It may be, therefore, necessary in this form of the invention to provide two or more control springs similar to spring 15 arranged one within the other, each spring controlling the return movement of one of the sliding tools and similarly also there will be a catch allocated to each implement.

An illustration of such a tool having three implements is shown in Figures 7 and 8 in which the three implements are denoted by the reference numerals 100, 110 and 111 of which the implements 110 and 111 are equivalent to the implements 10 and 11 of the previous construction, and the implement 100 is the added one. The collar 126 is the equivalent of the collar 26 of Figures 1 and 2.

As shown in Figure 8 both sliding implements will have two notches to cooperate with the catch 17 so that when either is moved to its operative position the catch can drop into the lower notch of the moved implement, the upper notch on the companion implement allowing for the necessary movement of the catch.

I claim:

1. A tool comprising in combination a handle, a plurality of implements located in the handle so that their working ends are always outside the latter, said implements being relatively slidable endwise side by side, a spring to retain one of said implements with its working end positioned inwardly below the working end of another implement, catch means to hold the spring controlled implement projected outwardly with its working end extending beyond the other implement, and a collar on the spring retained implement at a position outside the handle, said collar embracing the implements and affording means for manipulating said spring retained implement.

2. A tool comprising in combination a handle, a plurality of implements located in the handle so that their working ends are always outside the latter, one of said implements being slidable in the handle, a stop on another of said implements engaging the bottom of a recess in said handle, a collar fixed to said same implement where it emerges from said handle, said collar engaging said handle to hold said implement non-slidable therein, a spring to retain the slidable implement with its working end positioned inwardly below the working end of the non-slidable implement, a catch pivoted to said collar and engaging a notch in said slidable implement when the latter is moved outwardly so that its working end projects beyond the working end of the non-slidable implement, a spring fixed to said collar and biasing said catch in locking position, and stops on said slidable and non-slidable implements between which stops said first-mentioned spring abuts.

3. A tool comprising in combination a handle, at least two implements located in the handle so that their working ends are always outside the latter, said implements being relatively slidable endwise, side by side, a spring to retain at least one of said implements with its working end positioned inwardly below the working end of another such implement, and means to enable the spring controlled implement to be slid outwardly so that its working end will project beyond the other implement in order to replace one implement for another in position for use, the said means comprising a collar secured to the spring controlled implement to embrace the other implement and to afford means for manipulating the sliding implement against the action of the spring.

4. A tool comprising in combination a handle, at least two implements located in the handle so that their working ends are always outside the latter, said implements being relatively slidable endwise, side by side, a spring to retain at least one of said implements with its working end positioned inwardly below the working end of another such implement to be slid outwardly so that its working end will project beyond the other implement in order to replace one implement for another in position for use, the said sliding implement at its inner end within the handle being combined with a stop and engaged with the latter by means of a pivoted catch by which the said sliding implement is detachably connected to the stop and the said stop serves to engage one end of the spring by which the tool is withdrawn inwardly.

5. A tool comprising in combination a handle, a plurality of implements located in the handle so that their working ends are always outside the latter, said implements being relatively slidable endwise, side by side, a spring to resiliently retain at least one of said implements with its working end positioned below the working end of another such implement, and means to hold the spring controlled implement to be slid outwardly so that its working end will project beyond the other implement in order to replace one implement for another in position for use, said means comprising a collar secured to the spring-controlled implement and embracing the plurality of implements to afford means for manipulating the spring-controlled implement.

LUDVIG CHRISTIANSEN HOTVEDT.